W. W. Kingsbury.
Self Raker.
No. 92058.      Patented June 29, 1869.
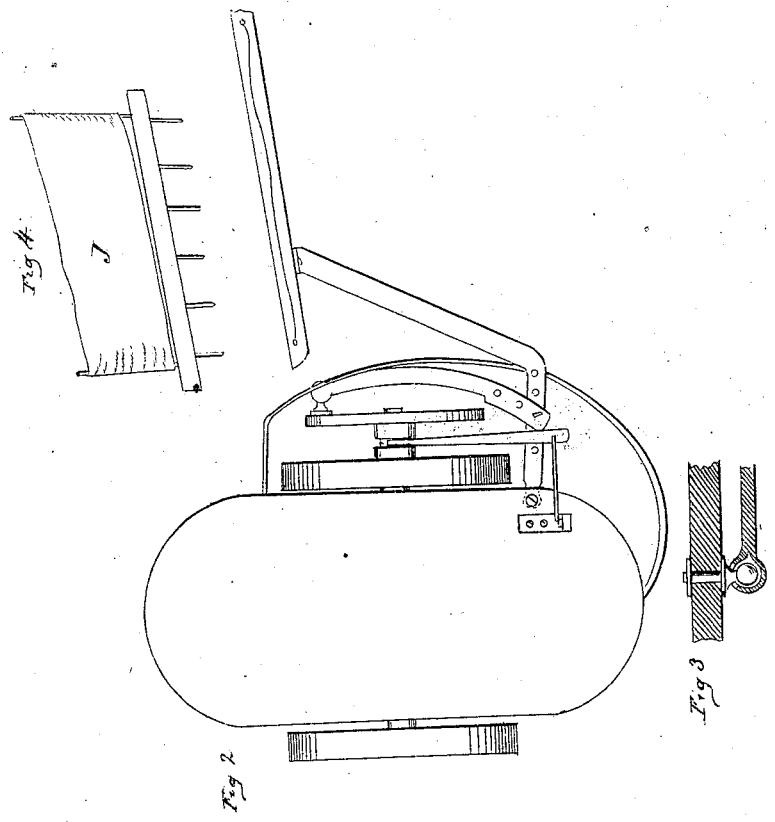
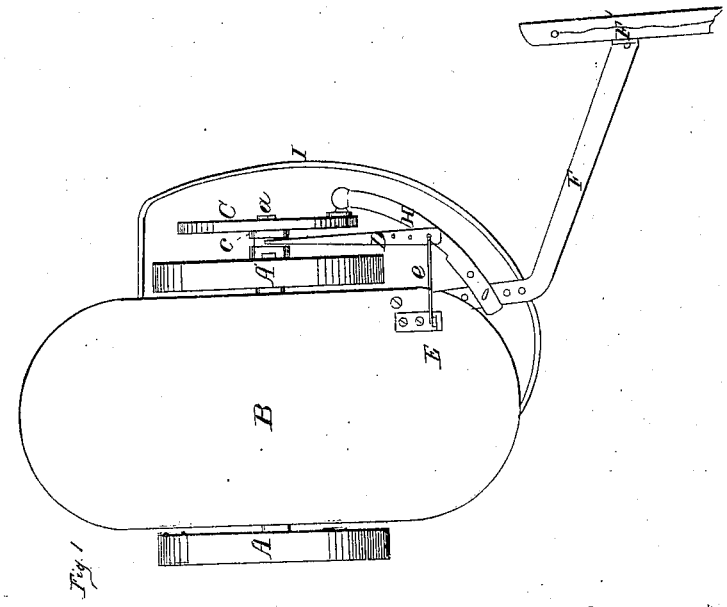
Witnesses.
C. F. Brown
F. Thomas
W. W. Kingsbury, Inventor
by H. W. Beadle, Attorneys.

United States Patent Office.

WILLIAM W. KINGSBURY, OF KALAMAZOO, MICHIGAN.

Letters Patent No. 92,058, dated June 29, 1869.

---

IMPROVEMENT IN HARVESTER-RAKES.

---

The Schedule referred to in these Letters Patent and making part of the same.

---

*To all whom it may concern:*

Be it known that I, WILLIAM W. KINGSBURY, of Kalamazoo, in the county of Kalamazoo, and State of Michigan, have invented a new and useful Improvement in Self-Rake for Reapers; and I do hereby declare that the following is a full and exact description of the same, reference being had to the accompanying drawings, and to the letters of reference marked thereon.

This invention relates to certain improvements in self-rakes for reapers, and consists in the construction and arrangement of the various parts, as will be fully described hereinafter.

In the drawings—

Figures 1 and 2 are plan views of my invention, showing the rake at different stages of operation;

Figure 3 is a sectional view of the ball-and-socket joint; and

Figure 4, a perspective view of the rake-head, with the screen attached.

To enable others skilled in the art to make and use my invention, I will proceed to describe fully its construction and operation.

A A' represent the wheels of a harvester, and B, its platform.

C represents a loose disk or wheel, provided with the grooved sleeve c, rigidly attached thereto, which revolves upon an extension of the axle a, as is clearly shown in the drawings.

The inner face of the sleeve c is provided with a suitable clutch-arrangement, which, when properly operated by the lever D, engages with a similar arrangement upon the outer face of the wheel A'.

D represents a bifurcated lever, the fingers of which rest in the groove of the sleeve c. This lever is suitably pivoted at a proper point, and is operated, when desired, by the hand-lever E, through the medium of the connecting-rod e.

F represents the rake-arm, which is attached, at its inner end, by a ball-and-socket joint, to the platform in rear of the wheel A', as is shown in the drawing. Its outer end is attached to the rake-head F', as shown, the latter being pivoted thereto in such manner as to revolve thereon slightly, when desired.

H represents a crank-arm, one end of which is eccentrically attached to the disk C, and the other to the rake-arm, as is shown. Both of these arms are provided with suitable holes for adjustment, as is also the disk C.

I represents the carrier-rod, which arches about the platform, as is clearly shown in the drawing. The rake-arm is so bent as to sweep the table properly, and so also are the carrier-rods and the crank-arm, in order to give the rake-arm the proper movement.

The rake-head is provided with the usual rake-teeth, and has also a screen, J, which consists of cloth stretched from bent rods, extending upward from the rake-head, by means of which the standing is separated from the cut grain.

The operation is as follows:

The machine having been thrown in gear, the rake-arm, through the medium of the crank-arm and carrier-rod, is first brought forward, and then swept back across the table, thus freeing it from gear. The rake-head being pivoted upon the arm, adjusts itself to the position of the table, even if the ground is uneven.

The arrangement of the gearing outside the driving-wheel, is a beneficial one. Of course the rake may be operated at every revolution of the disk C, or, by using the hand lever E, it may be permitted to operate only at intervals.

By the construction herein described, a simple and efficient self-rake is produced.

Having thus fully described my invention,

What I claim as new, and desire to secure by Letters Patent, is—

1. The pivoted rake-head F', provided with the screen J, as described, for the purpose set forth.

2. The rake-arm F, with rake-head F', crank-arm H, carrier-rod I, and disk C, when combined and arranged as and for the purpose described.

This specification signed and witnessed, this 1st day of March, 1869.

WM. W. KINGSBURY.

Witnesses:
  O. T. TUTHILL,
  WM. A. HOUSE.